United States Patent
Sakata et al.

(10) Patent No.: US 7,382,602 B2
(45) Date of Patent: Jun. 3, 2008

(54) POLARIZABLE ELECTRODE MEMBER, PROCESS FOR PRODUCING THE SAME, AND ELECTROCHEMICAL CAPACITOR UTILIZING THE MEMBER

(75) Inventors: Motohiro Sakata, Osaka (JP); Yukihiro Shimasaki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/667,411

(22) PCT Filed: Dec. 16, 2005

(86) PCT No.: PCT/JP2005/023113

§ 371 (c)(1),
(2), (4) Date: May 9, 2007

(87) PCT Pub. No.: WO2006/070617

PCT Pub. Date: Jul. 6, 2006

(65) Prior Publication Data

US 2007/0247788 A1 Oct. 25, 2007

(30) Foreign Application Priority Data

Dec. 27, 2004 (JP) ............................. 2004-376038
Apr. 12, 2005 (JP) ............................. 2005-114141

(51) Int. Cl.
*H01G 9/00* (2006.01)
(52) U.S. Cl. ...................................... 361/502; 361/503
(58) Field of Classification Search ........ 361/502–505; 29/25.03
See application file for complete search history.

(56) References Cited

U.S. PATENT DOCUMENTS

| 2001/0044045 A1 | 11/2001 | Sato et al. |
| 2002/0080558 A1 | 6/2002 | Nonaka et al. |
| 2002/0093783 A1* | 7/2002 | Bendale et al. ............. 361/502 |

FOREIGN PATENT DOCUMENTS

| JP | 11-154630 A | 6/1999 |
| JP | 11-288849 A | 10/1999 |
| JP | 2000-277393 A | 10/2000 |
| JP | 2001-307716 | 11/2001 |
| JP | 2004-186266 A | 7/2004 |

* cited by examiner

*Primary Examiner*—Eric Thomas
(74) *Attorney, Agent, or Firm*—McDermott Will & Emery LLP

(57) ABSTRACT

A polarized electrode for use in an electrochemical capacitor, in which electrode includes a current collector made of a metal plain foil, an anchor coat layer formed at least on one of the surfaces of the current collector, and an electrode layer formed on either the anchor coat layer or the current collector. The anchor coat layer contains a conductive carbon and a binder. The conductive carbon is graphitized carbon black. The binder contains at least one selected from the group consisting of an ammonium salt of carboxymethylcellulose, a rubber polymer, polytetrafluoroethylene, polyvinyl alcohol, polyvinyl pyrrolidone, alternating copolymer of isobutylene-maleic anhydride. With this configuration, a polarized electrode can be made thinner, and an electrode layer can be formed directly on the anchor coat layer. Furthermore, it can ensure sufficient coupling strength between the current collector and the electrode layer, and increase the energy density and the power density realizing a reduced resistance.

16 Claims, 6 Drawing Sheets

POLARIZABLE ELECTRODE MEMBER, PROCESS FOR PRODUCING THE SAME, AND ELECTROCHEMICAL CAPACITOR UTILIZING THE MEMBER

RELATED APPLICATIONS

This application is the U.S. National Phase under 35 U.S.C. § 371 of International Application No. PCT/JP2005/023113, filed on Dec. 16, 2005, which in turn claims the benefit of Japanese Application No. 2004-376038, filed on Dec. 27, 2004, and Japanese Application No. 2005-114141, filed on Apr. 12, 2005, the disclosures of which Applications are incorporated by reference herein.

TECHNICAL FIELD

The present invention relates to an electrochemical capacitor for various kinds of electronic apparatus, and a polarized electrode used in the electrochemical capacitor. A method for manufacturing the polarized electrode is also offered.

BACKGROUND ART

A capacitor which contains a conventional polarized electrode is described in, for example, Japanese Patent Unexamined Publication No. H11-154630, Japanese Patent Unexamined Publication No. 2004-186266, etc.

The structure of a conventional electrochemical capacitor 10 is described referring to FIG. 6. Capacitor element 11 shown in FIG. 6 includes a polarized electrode which has been formed of current collector 12 made of an aluminum foil or the like provided with an anchor coat layer formed at both surfaces, and electrode sheet 13 attached on the anchor coat layer. Capacitor element 11 is formed of two sheets of the polarized electrodes wound together with separator 14 disposed in between the two sheets.

Electrochemical capacitor 10 further includes a pair of aluminum lead wires 15 connected with respective polarized electrodes, metal case 16 made of aluminum which houses capacitor element 11 together with an electrolyte for driving (not shown), and sealing rubber 17 for sealing the open end of metal case 16, which sealing rubber is provided with through holes for allowing the pair of lead wires 15 to be led out and fitted to open end metal case 16 and then the edge of metal case is machined.

FIG. 7 is a perspective view used to describe the structure of polarized electrode 19, which forms capacitor element 11. FIG. 8 is a cross sectional view of the polarized electrode. As shown in FIG. 7 and FIG. 8, polarized electrode 19 is consisting of current collector 12 made of an aluminum foil, etc. whose surface has been roughened, anchor coat layer 18 provided at both surfaces of current collector 12, and electrode sheet 13 attached on anchor coat layer 18. Anchor coat layer 18 is formed of a conductive carbon of graphite or carbon black, and a binder.

Reason why it uses electrode sheet 13 is explained as followings. If an electrode layer is formed by coating a paste of electrode material on current collector 12 via anchor coat layer 18, a binder contained in anchor coat layer 18 may be decomposed and the decomposed binder may dissolve anchor coat layer 18. In order to avoid such a phenomenon to happen, electrode sheet 13 is provided beforehand, by kneading an activated carbon, a conductivity-providing material and a binder, and then crushing the above kneaded substance to be formed into a sheet form. Electrode sheet 13 thus provided is attached on anchor coat layer 18.

The above-configured conventional electrochemical capacitor exhibits a high power density and provides a large current in a moment, as compared to secondary storage batteries. So, it is being studied to use the capacitors as a power assist of the electric mobiles, and for the uninterruptible power systems, etc. The capacitors are requested to exhibit a still higher power density, as well as to improve the energy density, the reliability under a continuous voltage application and the durability against repeated cycles of charge-discharge operation.

The most effective means for increasing the energy density and the power density of the above described electrochemical capacitors is thinning the current collector. The thinner current collector brings about remarkable advantages; an increased electrical capacitance which is the reflection of an increased volume shared by the electrode layer in a cell, and a reduced internal resistance which is the reflection of an increased opposing area between the polarized electrodes.

In order to reduce the internal resistance and to curtail a deterioration of the electrical capacitance, conventional electrochemical capacitors use a surface-etched and roughened aluminum foil for the current collector. However, the surface-etched and roughened aluminum foil has a problem; that is, strength of the foil is not high enough to withstand a tension it could encounter during manufacturing stage, sometimes it is broken during manufacturing. Thus, it is not easy to make the foil thinner.

On the other hand, an aluminum foil whose surface is not roughened (hereinafter referred to as a plain foil) has a higher strength, so it can be made thinner. However, a plain foil, or an un-etched foil, has no etch pit. So, a contact area between electrode layer and current collector decreases and the coupling strength deteriorates. As the result, the internal resistance increases and the reliability deteriorates with an electrochemical capacitor.

Furthermore, it is difficult in the conventional capacitors to form an electrode layer directly on anchor coat layer 18. Therefore, electrode sheet 13 is employed. An additional step for manufacturing electrode sheet 13 brings about a lowered productivity, generating a serious cost issue.

SUMMARY OF THE INVENTION

It was difficult for a conventional technology to reduce the thickness of a current collector using a plain foil aiming for increasing the energy density as well as the power density of a capacitor with a lower internal resistance and a higher reliability, at the same time, achieving an improved manufacturing productivity and cost reduction.

The present invention aims to help attaining the above-described tasks and offer a polarized electrode which provides an increased energy density and power density at lower resistance and higher reliability, with an increased productivity and a reduced cost. The present invention also offers a method for manufacturing the polarized electrode and an electrochemical capacitor which contains the polarized electrode.

A polarized electrode in the present invention includes a current collector made of a metal plain foil, an anchor coat layer provided at least on one of the surfaces of the current collector, and an electrode layer provided on either the anchor coat layer or the current collector. The anchor coat layer contains a conductive carbon and a binder. A graphitized carbon black is used for the conductive carbon. The binder contains at least one selected from among the group consisting of an ammonium salt of carboxymethylcellulose, a rubber polymer, polytetrafluoroethylene, polyvinyl alcohol, polyvinyl pyrrolidone, alternating copolymer of isobutylene-maleic anhydride.

A method for manufacturing a polarized electrode in the present invention is consisting of the steps of mixing a conductive carbon, a binder and a dispersion medium to provide a slurry; coating the slurry on the surface of a plain foil current collector to provide an anchor coat layer; coating a paste of electrode material on the anchor coat layer to provide an electrode layer; and rolling the current collector having the anchor coat layer and the electrode layer provided thereon.

An electrochemical capacitor in the present invention includes a pair of the above-described polarized electrodes laminated, or wound, with a separator in between the electrodes, which pair of the polarized electrodes being housed and sealed in a case together with an electrolyte for driving.

A polarized electrode in the present invention as described in the above can be implemented in a thin configuration. Since the polarized electrode can secure a sufficient coupling strength between current collector and electrode layer, it can suppress an increase of internal resistance and a deterioration of electrical capacitance, and offers an improved energy density and power density. The use of a graphitized carbon black for the conductive carbon, or a constituent of the anchor coat layer, contributes to realize a lower resistance.

Figure 1:
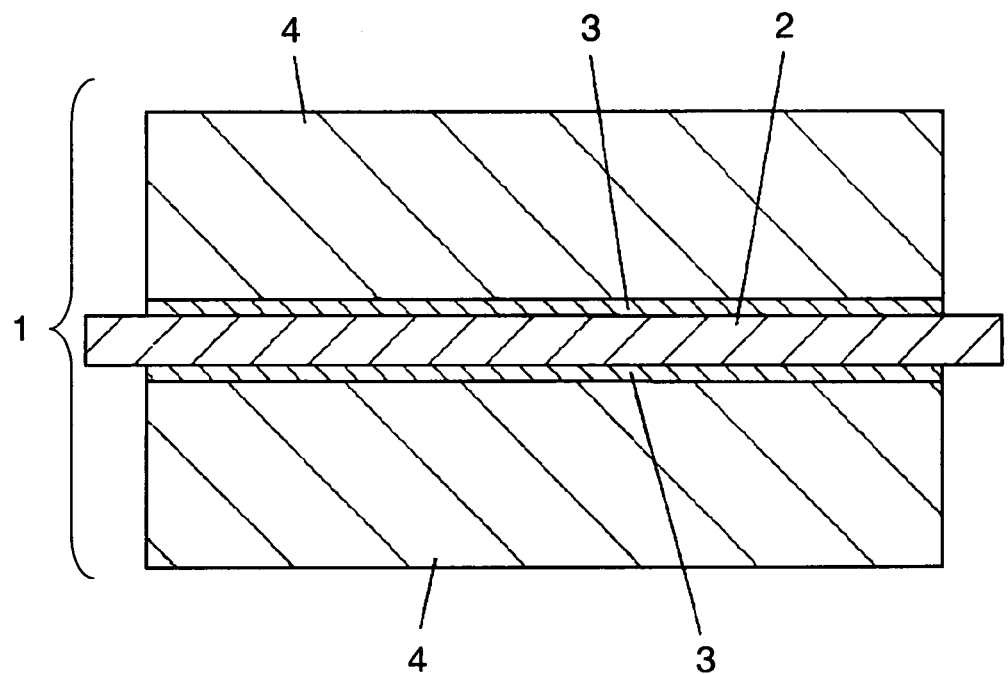
FIG. 1 is a cross sectional view of a polarized electrode in accordance with an exemplary embodiment of the present invention.

REFERENCE MARKS IN THE DRAWINGS 1, 5 Polarized Electrode
2 Current Collector
3 Anchor Coat Layer
4 Electrode Layer
6 Conductive Carbon 7 Binder
8 Spontaneous Oxide Film
9 Activated Carbon

DETAILED DESCRIPTION OF PREFERRED EMBODIMENT

A polarized electrode in the present invention is formed of a plain foil used for current collector and an anchor coat layer which has conductivity and an adhesive property disposed between the current collector and an electrode layer. This structure makes it possible to form the electrode in a thinner configuration and to provide the electrode layer directly on the anchor coat layer. Furthermore, since a sufficient coupling strength is insured between the current collector and the electrode layer, it can suppress an increase of the internal resistance and a deterioration of electrical capacitance realizing an increased energy density and power density. Still further, the use of a graphitized carbon black as conductive carbon in providing the anchor coat layer contributes to the lower resistance.

In the following, the present invention is described using an exemplary embodiment.

Exemplary Embodiment

Figure 2:
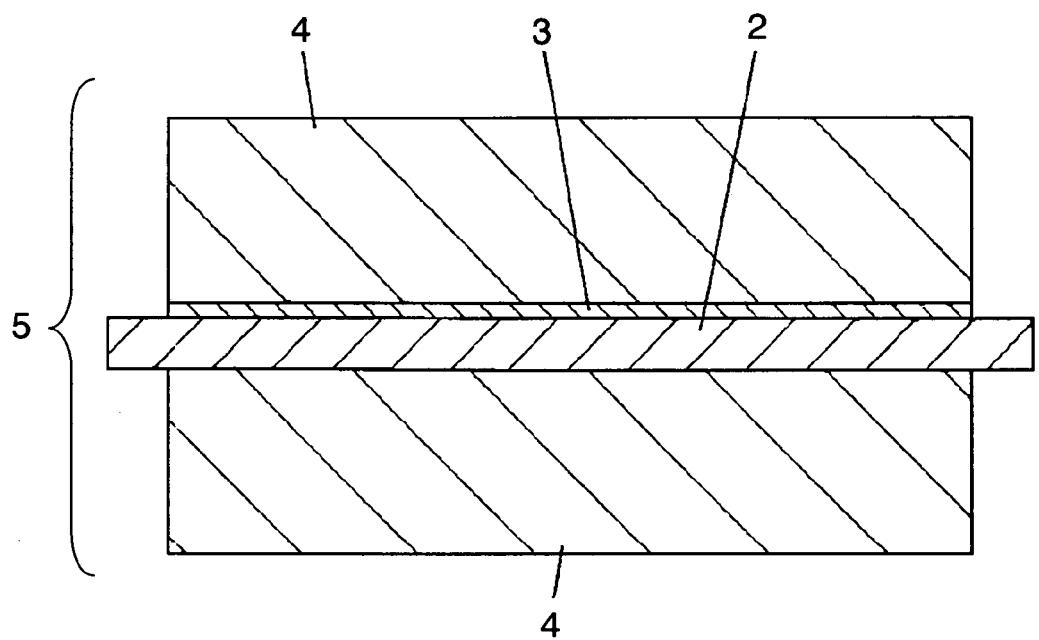
FIG. 2 is a cross sectional view of other polarized electrode in an embodiment of the present invention.

FIG. 1 is a cross sectional view used to describe the structure of a polarized electrode in accordance with an exemplary embodiment of the present invention. FIG. 2 is a cross sectional view of other polarized electrode in the embodiment.

As shown in FIG. 1, polarized electrode 1 is formed of current collector 2 made of a metal foil having a plain surface, viz. surface not roughened, and anchor coat layer 3 disposed on both surfaces of the current collector, and electrode layer 4 which contains an activated carbon as the main component provided on anchor coat layer 3. Material used for current collector 2 in the present embodiment is an aluminum foil.

The plain foil in the present invention means that defined in JIS B 0601-1994; average roughness (Ra) 0.5 μm or less, max height (Ry) 2.0 μm or less, ten-point roughness (Rz) 1.0 μm or less. The surface roughness of aluminum foil used in the present embodiment was measured. The result is shown in Table 1 and Table 2.

TABLE 1

| Point of Measurement | Point 1 | Point 2 | Point 3 | Point 4 | Point 5 |
|---|---|---|---|---|---|
| Ra | 0.13 | 0.13 | 0.13 | 0.13 | 0.14 |
| Ry | 0.63 | 0.61 | 0.92 | 0.57 | 1.12 |
| Rz | 0.57 | 0.59 | 0.70 | 0.55 | 0.82 |

TABLE 2

| Point of Measurement | Point 1 | Point 2 | Point 3 | Point 4 | Point 5 |
|---|---|---|---|---|---|
| Ra | 0.12 | 0.12 | 0.16 | 0.12 | 0.10 |
| Ry | 0.49 | 0.57 | 1.24 | 0.13 | 0.65 |
| Rz | 0.39 | 0.48 | 0.50 | 0.57 | 0.52 |

Table 1 shows the surface roughness in horizontal direction relative to TD (unit: μm). Table 2 the surface roughness in vertical direction relative to TD (unit: μm). Here, TD refers to the transfer direction of aluminum foil on the production line.

FIG. 2 shows polarized electrode 5; where, anchor coat layer 3 is provided at only one of the surfaces of current collector 2 while electrode layer 4 is provided at both of the surfaces of current collector 2.

As to the material for current collector 2, any metal materials may be used in so far as a dielectric oxide film is formed by anodic oxidation. Besides the above aluminum material used in the present embodiment, copper, titanium, niobium, tantalum, nickel, hafnium, zirconium, zinc, tungsten, bismuth, antimony, magnesium, alloys of these metals or their conductive compounds may be used. Preferred among them are those metals which form an anodic oxide film through anodic oxidation; such as aluminum, titanium, niobium, tantalum, nickel, hafnium, zirconium, zinc, tungsten, bismuth, antimony, magnesium, etc.

In the case of an electrochemical capacitor having an electric double layer, the current collector metal in the positive side is deprived of the electron during charging period and dissolves as metal cation into electrolyte. If the metal cation does not react with the electrolyte anion, dissolving and separating of metal is repeated during the charging discharging cycle. As the result, current collector 2 becomes fragile and deteriorates in the current collecting function. In other case where dissolved metal cations combine with the electrolyte and compounds are generated, the generated compound is instable electrochemically and reacts reversibly during discharging, the capacitor of electric double layer exhibits a remarkable deterioration in the internal resistance and the electrical capacitance. This is because Faraday reaction is repeated during the charging/discharging and reaction resistance is generated. The reaction resistance does not appear in the ion adsorption/desorption, viz. non-Faraday reaction. Therefore, it is preferred to use one selected from among the above-described metal materials; a compound of the metal cation and the electrolyte anion is electrochemically stable. By so doing, an irreversible dielectric oxide film is formed also at the discharging, and occurrence of the fragility with current collector 2, the increase of internal resistance and the deterioration of electrical capacitance, etc. can be prevented. Thus, the above-described materials are suitable for use as current collector 2.

Figure 3:
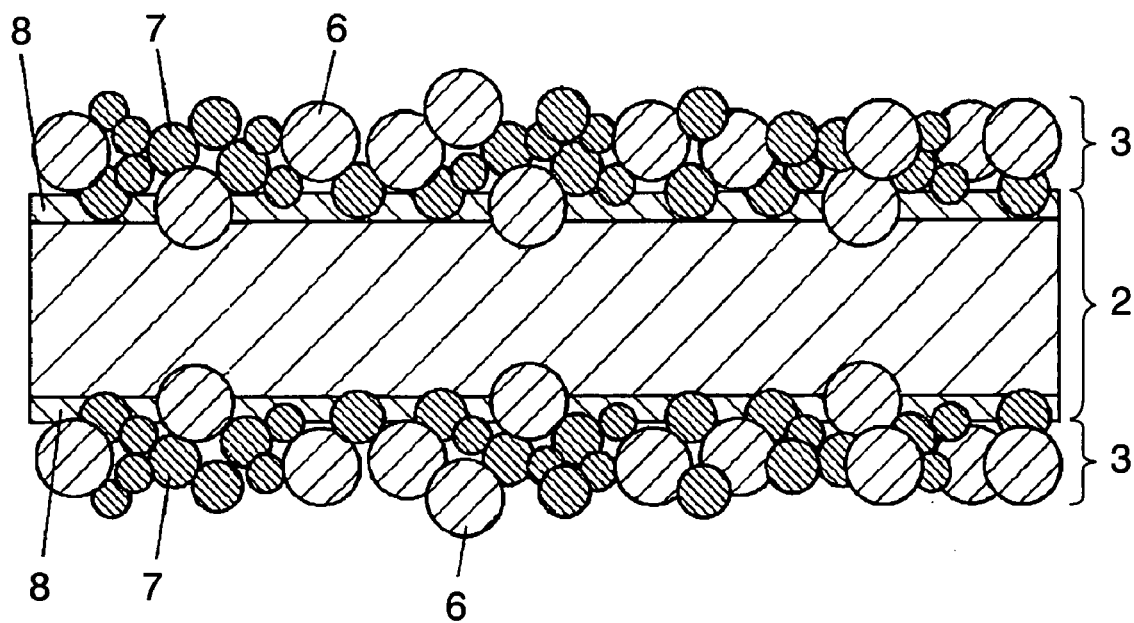
FIG. 3 is a cross sectional view showing the structure of an anchor coat layer in an embodiment of the present invention.

FIG. 3 is a cross sectional view used to show the structure of the above-described anchor coat layer 3. As shown in FIG. 3, anchor coat layer 3 is made of conductive carbon 6 and binder 7. If a metal is used as conductive filler in anchor coat layer 3, it is anodized during charging to become a metal cation, which dissolves into electrolyte. So, anchor coat layer 3 is unable to keep its conductivity. Also, if a valve metal which forms a dielectric oxide film, or an insulating layer, is used, the conductivity deteriorates due to an insulating layer formed. Therefore, carbon is a suitable material as conductive filler for anchor coat layer 3. Carbon is electrochemically stable and maintains its conductivity even after repeated charging/discharging cycles. Thus, carbon is a preferred material as conductive filler for anchor coat layer 3.

As shown in FIG. 1 and FIG. 3, binder 7 adheres respective conductive carbons 6 together, adheres anchor coat layer 3 with current collector 2, and adheres anchor coat layer 3 with electrode layer 4. This contributes to raise the physical stability and the reliability of an electrochemical capacitor.

In the present embodiment, graphitized carbon black is used as conductive carbon 6 for the above-described anchor coat layer 3. As illustrated in FIG. 3, at least a part of conductive carbon 6 is intruding into current collector 2.

Preferred depth of the intrusion is within a range 5 nm-5 μm. If the intruding depth of conductive carbon 6 is 5 nm or less, conductive carbon 6 might not be able to penetrate through spontaneous oxide film 8 covering the surface of current collector 2. If conductive carbon 6 failed penetrating through spontaneous oxide film 8, the electrical conduction between current collector 2 and anchor coat layer 3 becomes insufficient, which leads to an unfavorable situation of increased internal resistance within an electrochemical capacitor. Contrary, if the intrusion depth of conductive carbon 6 is 5 μm or more, current collector 2 becomes extremely thin in the effective thickness. In this case, the foil may become too weak to withstand a tension incurred on the manufacturing line, rendering the production difficult.

Graphite is a carbon having the sp2 hybrid orbital. Among the four L nucleus electrons, three are σ electrons which form a hexagonal net plane by making a covalent bond with adjacent σ electrons on the same plane. The remaining one is π electron forming electron orbit disposed perpendicular to the hexagonal net plane. Since the π electron does not stay localized, it provides a high electrical conductivity. Carbon black forms a crystallite in a state where micro crystals of pseudo-graphite structure are laminated in parallel, the crystallites are gathering together to form a particle, and the particles are sticking mutually to form a structure. The π electron jumps as the result of contact with the structure, providing a high electrical conductivity. Graphitized carbon black is a carbon black whose particle surface has been made into graphite; as the result, the electrical conductivity of carbon black has been raised a step further. The use of graphitized carbon black as conductive filler of anchor coat layer 3 contributes to lower the internal resistance of an electrochemical capacitor.

Furthermore, since graphitized carbon black is not orientated in parallel direction alone with respect to the surface of current collector 2 and it does not dissolve into electrolyte, it can realize a low resistance. Still further, graphitized carbon black undergoes a heat treatment in the manufacturing process. Since the heat treatment purges impurities, a deterioration of the resistance value is suppressed to be very small.

Figure 4A:
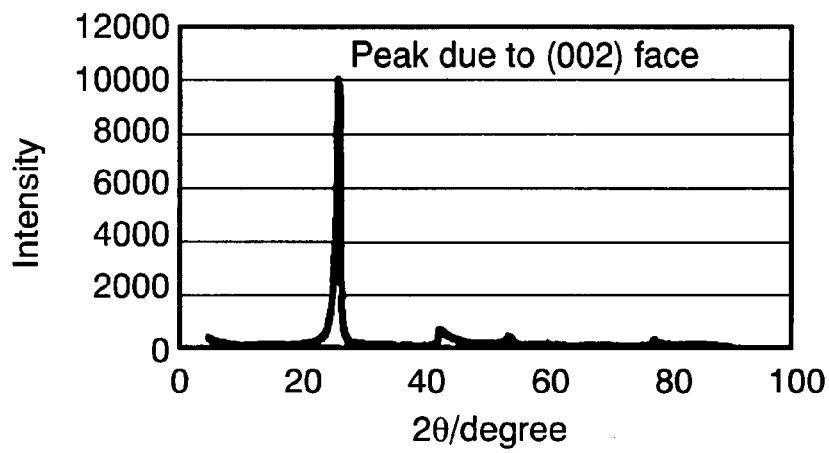
FIG. 4A is a characteristics chart used to show the peak intensity in an X-ray diffraction analysis of a graphitized carbon black constituting an anchor coat layer in an embodiment of the present invention.
Figure 4B:
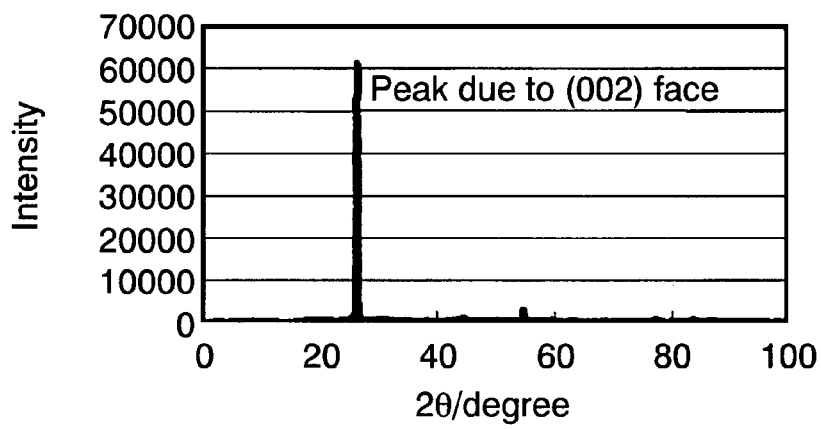
FIG. 4B is a characteristics chart used to show the peak intensity in an X-ray diffraction analysis of graphite constituting an anchor coat layer in a comparative example.
Figure 4C:
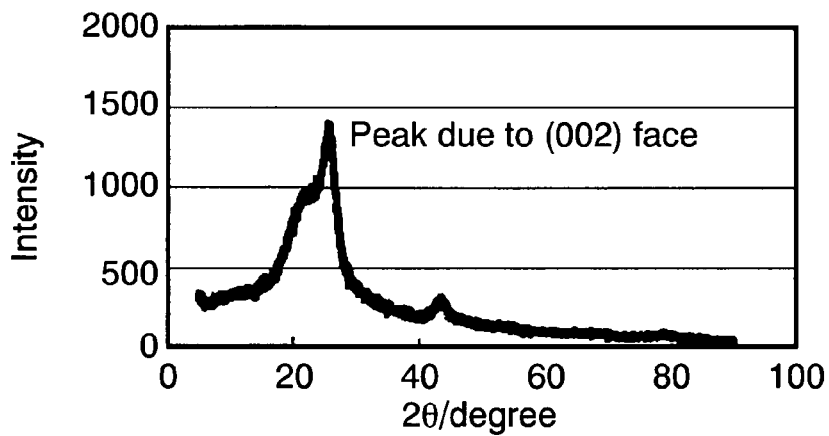
FIG. 4C is a characteristics chart used to show the peak intensity in an X-ray diffraction analysis of acetylene black constituting an anchor coat layer in a comparative example.

FIG. 4A shows peak intensity of the graphitized carbon black in X-ray diffraction analysis. The peak intensity due to (002) face, which being the often-used index showing crystalline property (degree of graphitization) of carbon materials, is approximately 10000. FIG. 4B and FIG. 4C show the peak intensities of graphite and acetylene black, respectively, for the sake of comparison on the same basis. The peak intensity of graphite is approximately 60000, while that of acetylene black is approximately 1400, as indicated in FIG. 4B and FIG. 4C. In order to provide the same advantages as described in the above in accordance with the present invention, it is preferred that the peak intensity in X-ray diffraction analysis of conductive carbon is 2500 or higher.

It is preferred that the above conductive carbon has an average particle diameter of 30 nm-10 μm. If it is smaller than 30 nm, fine particles of conductive carbon 6 are easily blown up in the air in the production step, and the efficiency of handling deteriorates. Contrary, if it is larger than 10 μm, the thickness of anchor coat layer 3 will become too thick and the thickness of electrode layer 4 will be reduced accordingly, which invites a reduced capacitance.

Basically, it is difficult to increase the conductivity of an electrochemical capacitor using a plain foil, viz. a foil whose surface is not roughened, for current collector 2, because the contact area with electrode layer 4 is small. As means for improvement, the capacitor in the present invention uses graphitized carbon black for conductive carbon 6 as shown in FIG. 3. The use of the high conductivity graphitized carbon black has made it possible to employ a plain foil for current collector 2 without being nervous about a possible deterioration of the conductivity. As the results of the use of plain foil for current collector 2, the foil strength increases significantly, and it becomes quite easy to reduce the thickness. Thereby, a volume shared by electrode layer 4 in an electrochemical capacitor can be increased and the electrical capacitance raised. In a case where a wound type element is used, a number of winding turns can be increased with the thinner foil. So, an opposing area of polarized electrode 1 can be increased for the reduction of internal resistance. It is preferred that current collector 2 has a thickness of 1 μm-100 μm. The thickness range represents a range within which the advantages in terms of the foil strength, the increased capacitance due to thinning, and the reduction of internal resistance can be implemented in accordance with the present invention with a good mutual balance among the respective items.

Binder 7 used for providing the anchor coat layer 3 in the present invention is ammonium salt of carboxymethylcellulose. Besides the material, a rubber polymer, polytetrafluoroethylene, polyvinyl alcohol, polyvinyl pyrrolidone, an alternating copolymer of isobutylene-maleic anhydride, etc. may be used instead. The binder material is not limited to the above-described items; any water-soluble material can be used for the application if it turns into a material which is difficult to dissolve into water when dried.

In anchor coat layer 3, preferred weight % of binder 7 to conductive carbon 6 is 1%-50%. If binder 7 is used for a weight % within the range, an electrochemical capacitor can realize a reduced internal resistance and improved reliability. If the weight % of binder 7 is higher than 50%, the conductivity of anchor coat layer 3 deteriorates because of over existence of binder 7 which has insulating property. This causes an increased internal resistance in an electrochemical capacitor. Contrary, if the weight percentage of binder 7 is lower than 1%, the adhesive capability of anchor coat layer 3 becomes weak, which results in a higher internal resistance of an electrochemical capacitor and a significant deterioration in the electric capacitance.

It is preferred that anchor coat layer 3 has a thickness of 50 nm-20 μm. Like in the case of the average particle diameter of conductive carbon 6, anchor coat layer 3 having a thickness within the above range satisfies both of the demands for higher operation efficiency and increased capacitance in a good balance.

It is preferred that the above-configured anchor coat layer in the present invention has a conductivity of 7.5 S/cm or higher (S: conductance, viz. Siemens).

Anchor coat layer 3 is manufactured through the following process. (1) dispersing conductive carbon 6 of graphitized carbon black and binder 7 in a dispersion medium (not shown) for producing an anchor coat slurry, (2) coating the anchor coat slurry on both surfaces of current collector 2, (3) after the slurry was coated, the dispersion medium is removed by drying.

Figure 5:
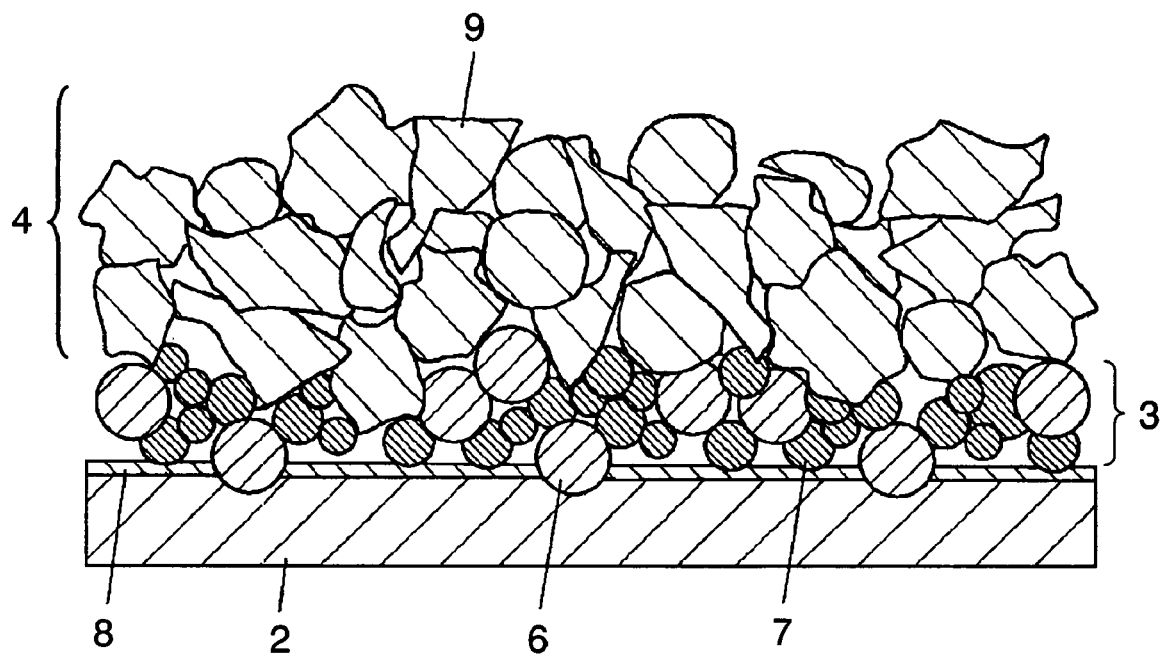
FIG. 5 is a cross sectional view showing an electrode layer in an embodiment of the present invention.

Electrode layer 4 is formed on current collector 2 via anchor coat layer 3. As shown in FIG. 5, electrode layer 4 contains activated carbon 9 as the main component, also contained (not shown) are a binder, a conductive carbon, etc.

As illustrated in FIG. 5, electrode layer 4 is partially intruding into anchor coat layer 3. Preferred depth of the intrusion of electrode layer 4 is 1-99.85% of thickness of anchor coat layer 3. The intrusion of electrode layer 4 into anchor coat layer 3 increases the contact area between activated carbon 9 which constitutes electrode layer 4, and conductive carbon 6 which constitutes anchor coat layer 3. This provides an advantage of enhancing the electrical conduction between anchor coat layer 3 and electrode layer 4. However, if the intrusion depth is so deep and activated carbon 9 makes contact with current collector 2, the above-described advantage is not available because the conductivity of activated carbon 9 itself is low. Therefore, a preferred state is that at least conductive carbon 6 of anchor coat layer 3 exist between current collector 2 and electrode layer 4. Assuming a practical example where conductive carbon 6 has a particle diameter 30 nm, anchor coat layer 3 has a thickness 20 μm, if there is only one layer between electrode layer 4 and current collector 2 formed of a number of single particles of conductive carbon 6 spreading all over; the intrusion depth of electrode layer 4 will be 99.85% to anchor coat layer thickness.

A test was made on the adhesive strength of above-configured anchor coat layer 3 constituting polarized electrode 1. The test method is explained as followings. At first, an adhesive cellophane tape of 2 cm(W)×5 cm(L) is sticked on polarized electrode 1, and then a load is given by 90-degree peeling tester. It was confirmed in the test that peeling occurred in electrode layer 4 due to cohesive failure, while peeling was observed neither in the interface between current collector 2 and anchor coat layer 3 nor in the interface between anchor coat layer 3 and electrode layer 4. The test results may be indicating that binder 7 contained in anchor coat layer 3 is performing well to ensure a sufficient adhesive strength.

Activated carbon 9 in the present invention uses phenolic resin as the raw material, which is treated with potassium hydroxide. Besides phenolic resin, a coconut shell, a powdered wood, a paper, a petroleum coke, a petroleum pitch, a coal coke, etc. may be used as the raw material for activated carbon 9. As to the treatment with potassium hydroxide, any one of sodium hydroxide, water vapor, carbon dioxide, phosphoric acid and zinc chloride, etc. may be used instead of potassium hydroxide for the same purpose.

The above-described treatment is for increasing the specific surface area of a raw material having no structural small cavity by turning it into a porous structure. The treatment can increase an electrical capacitance per unit volume. By selecting a combination of raw material and treating method, activated carbon 9 can be modified in the structure, specific surface area, etc. to be best adapted to a certain specific purpose. So, the electrical capacitance, the internal resistance, etc. of an electrochemical capacitor can be designed optionally by selecting an appropriate raw material and a suitable method of treating.

It is preferred that the above activated carbon 9 has an average particle diameter of 0.3-40 μm. In the activated carbon 9, the larger the average particle diameter the deeper the small cavity will become. Then, it takes longer time for an ion before reaching the innermost of a deep cavity. This is undesirable because the diffusion resistance of ion grows bigger and the resistance of entire element is raised.

Now in the following, a method for manufacturing polarized electrode 1 will be outlined.

(1) Put activated carbon 9, binder (not shown), conductive carbon (not shown), etc. in a planetarium mixer (not shown) together with a dispersion medium. Knead these to provide an electrolyte (not shown). (2) Put the electrolyte in a pressure homogenizer (not shown) for dispersing. (3) Apply the dispersed electrolyte on both surfaces of current collector 2, which has been provided with anchor coat layer 3, and dry it. (4) As the final step, current collector 2, which has been provided at both surfaces with the electrolyte and dried, is rolled. By controlling the rolling pressure, the intruding depth of electrode layer 4 into anchor coat layer 3 can be adjusted to be 1-100% to the thickness of anchor coat layer.

Next, a practical example of materials used to constitute polarized electrode 1 in the present embodiment is described. Current collector 2 is made of a plain aluminum foil. Electrode layer 4 is a mixture of activated carbon (88 weight %), conductive carbon (6 weight %), carboxymethylcellulose (4 weight %) and polytetrafluoroethylene (2 weight %). Anchor coat layer 3 is a mixture of graphitized carbon black (80 weight %) as the conductive carbon and carboxymethylcellulose (20 weight %).

Figure 6:
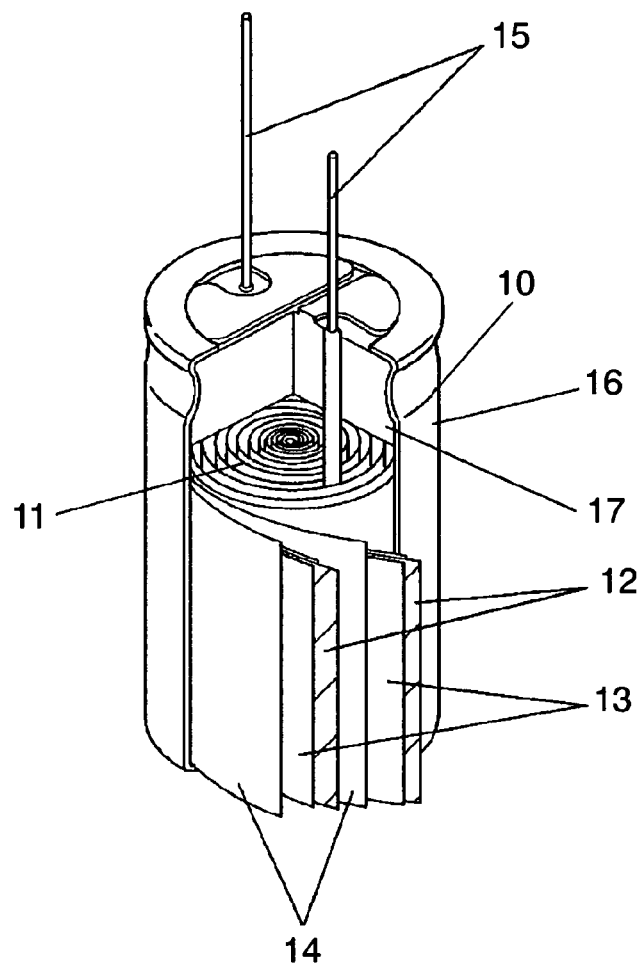
FIG. 6 is a partially cut away perspective view of an electrochemical capacitor.
Figure 7:
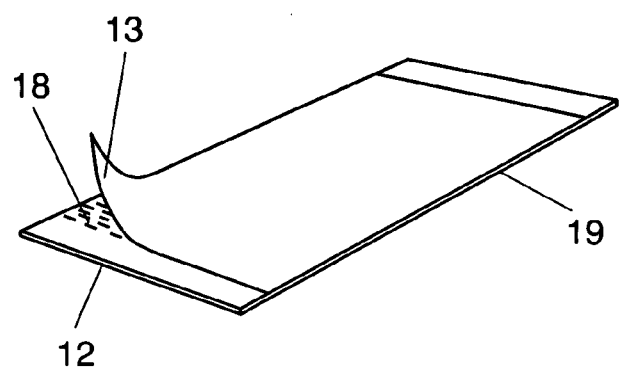
FIG. 7 is a perspective view of a conventional polarized electrode used as an element of electrochemical capacitor.
Figure 8:
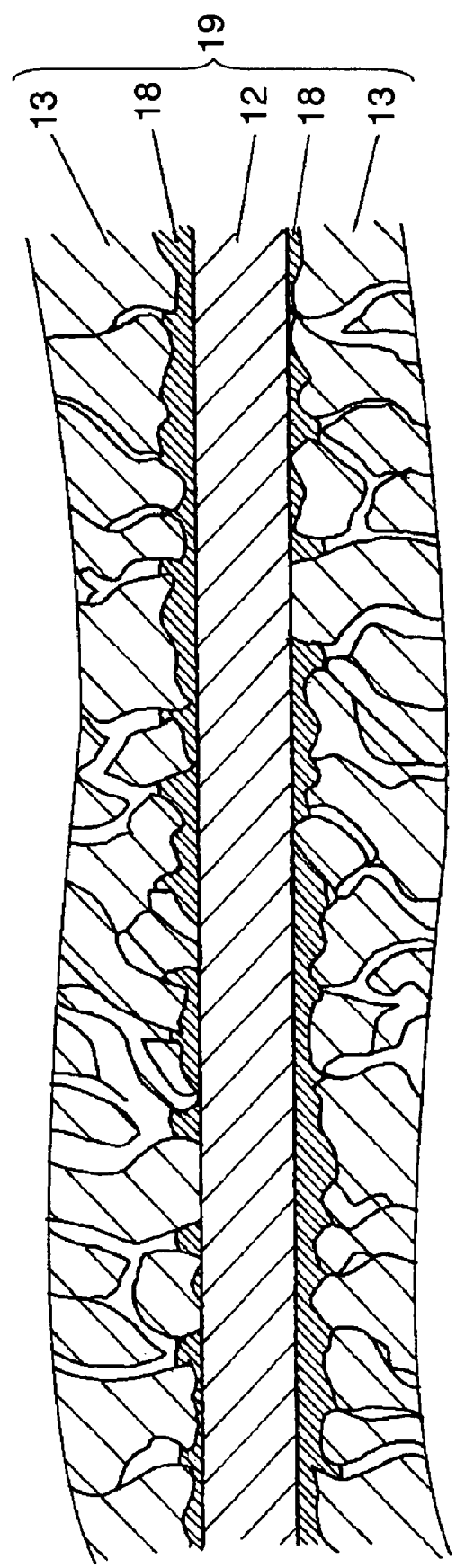
FIG. 8 is a cross sectional view of a conventional polarized electrode used as an element of electrochemical capacitor.

An electrochemical capacitor shown in FIG. 6 was manufactured using polarized electrode 1 thus provided. Element 11 is made of two sheets of polarized electrodes prepared in accordance with the present embodiment wound together with separator 14 in between the two sheets. Electrochemical capacitor 10 further includes lead wires 15, metal case 16 and sealing rubber 17. Lead wires 15 are made of aluminum, each of which is connected with either one of the two polarized electrodes. Metal case 16 is made of aluminum, which houses element 11 together with an electrolyte (not shown). Sealing rubber 17 has two through holes for allowing the pair of lead wires 15 to come out of the metal case. The sealing rubber is affixed to the open end of metal case 16, and then the end part of the case is machined for sealing.

Characteristics of an electrochemical capacitor which includes polarized electrode 1 made in accordance with the present embodiment were measured. The results of measurement are shown in Table 3, together with Comparisons 1 through 3. The method of measurement is: (1) apply fixed voltage 2.3 V continuously, and (2) after a certain predetermined time, electrical capacitance and internal resistance were measured.

Comparison 1 is a capacitor which includes the polarized electrode in which conductive filler is acetylene black and the electrode layer is formed on a plain foil current collector via an anchor coat layer. Comparison 2 is a capacitor which includes the polarized electrode in which an electrode layer is formed directly on the plain foil current collector without any intervening anchor coat layer. Comparison 3 is a capacitor which includes the polarized electrode in which an electrode layer is formed directly on the current collector without any anchor coat layer, where the current collector has roughened surface by etching.

TABLE 3

| | Electrical Capacitance(F) | | | Internal Resistance(m Ω) | | |
| --- | --- | --- | --- | --- | --- | --- |
| Time | Initial | After 500 h | After 2000 h | Initial | After 500 h | After 2000 h |
| Embodiment 1 | 103.6 | 90.0 | 85.2 | 20.2 | 20.2 | 20.2 |
| Comparison 1 | 99.9 | 84.7 | 79.8 | 21.4 | 21.7 | 21.7 |
| Comparison 2 | 99.8 | 83.7 | 79.0 | 21.0 | 21.3 | 21.4 |
| Comparison 3 | 100.0 | 86.0 | 81.5 | 20.2 | 20.4 | 20.5 |

As Table 3 indicates, an electrochemical capacitor in accordance with the present embodiment has the greater initial electrical capacitance and the lower initial internal resistance, as compared with Comparison 1. Also in the measurements at 500 hours and at 2000 hours of the continuous fixed voltage test, the deterioration rates with these test items are lower in Embodiment 1. These differences of the measurement results become still bigger when it is compared to Comparison 2.

Comparing it with Comparison 3, whose current collector has been etched for realizing a lower resistance, Embodiment 1 is even higher in the initial electrical capacitance, and the initial internal resistance is low. Also in the measurements at 500 hours and at 2000 hours of the continuous fixed voltage test, the deterioration rates in Embodiment 1 are lower.

As described in the above, an electrochemical capacitor which includes a polarized electrode in accordance with the present invention exhibits a low initial internal resistance and maintains the low resistance for a long time. At the same time, it exhibits a high electrical capacitance and maintains the high capacitance for a long time.

Although an electrochemical capacitor in the present embodiment includes an element which has been provided by winding polarized electrodes in accordance with the present embodiment with a separator in between, the element may be provided instead by laminating polarized electrodes made in accordance with the present embodiment inserting a separator in between the electrodes.

INDUSTRIAL APPLICABILITY

A polarized electrode provided in accordance with the present invention and a method for manufacturing the polarized electrode, as well as an electrochemical capacitor containing the polarized electrode offer the advantages of lowering the resistance and increasing the capacitance. The advantage may offer a useful contribution in the industry, specifically in such sectors as the power assists for electric vehicles and the uninterruptible power systems.

The invention claimed is:

1. A polarized electrode comprising a current collector made of a metal plain foil, an anchor coat layer formed on at least one of the surfaces of the current collector, and an electrode layer formed on either the anchor coat layer or the current collector;
    wherein the anchor coat layer contains a conductive carbon and a binder,
        the conductive carbon is a graphitized carbon black having an X-ray diffraction intensity 2500 or higher due to (002) face,
        the binder contains at least one selected from the group consisting of an ammonium salt of carboxymethylcellulose, a rubber polymer, polytetrafluoroethylene, polyvinyl alcohol, polyvinyl pyrrolidone, and an alternating copolymer of isobutylene-maleic anhydride.

2. The polarized electrode of claim 1, wherein the electrode layer includes activated carbon having an average particle diameter of 0.3-40 μm.

3. An electrochemical capacitor comprising
    an element which has been formed by either winding polarized electrodes with a separator in between or by laminating them,
    an electrolyte for driving the capacitor impregnated in the separator, and
    a case for housing the element;
    wherein the polarized electrode is a polarized electrode in claim 2.

4. The polarized electrode of claim 1, wherein the conductive carbon has an average particle diameter of 30 nm-10 μm.

5. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claim 4.

6. The polarized electrode of claim 1, wherein the conductive carbon contains the binder of a weight percentage of 1-50%.

7. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claim 6.

8. The polarized electrode of claim 1, wherein the anchor coat layer has a thickness of 50 nm-20 μm.

9. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claim 8.

10. The polarized electrode of claim 1, wherein the anchor coat layer has an electric conductivity 7.5 S/cm or higher.

11. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claim 10.

12. The polarized electrode of claim 1, wherein the conductive carbon is intruding at least in part into the current collector for a depth of 5 nm-5 μm from the surface.

13. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claims 12.

14. The polarized electrode of claim 1, wherein the electrode layer intrudes at least in part into the anchor coat layer in a depth of 1-99.85% to the anchor coat layer thickness.

15. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claim 14.

16. An electrochemical capacitor comprising
an element which has been formed by either winding polarized electrodes with a separator in between or by laminating them,
an electrolyte for driving the capacitor impregnated in the separator, and
a case for housing the element;
wherein the polarized electrode is a polarized electrode in claim 1.

* * * * *